(12) United States Patent
Manitiu et al.

(10) Patent No.: US 9,790,365 B2
(45) Date of Patent: Oct. 17, 2017

(54) THERMOPLASTIC POLYURETHANE COMPOSITION

(71) Applicant: BASF SE, Ludwigshafen (DE)

(72) Inventors: Mihai Manitiu, Macomb, MI (US); Jeffrey L. Degross, Sylvania, OH (US); Terry Kowalski, Wyandotte, MI (US); Mark E. Justice, Detroit, MI (US)

(73) Assignee: BASF SE, Ludwigshafen (DE)

( * ) Notice: Subject to any disclaimer, the term of this patent is extended or adjusted under 35 U.S.C. 154(b) by 73 days.

(21) Appl. No.: 14/407,773

(22) PCT Filed: Jun. 12, 2013

(86) PCT No.: PCT/US2013/045423
§ 371 (c)(1),
(2) Date: Dec. 12, 2014

(87) PCT Pub. No.: WO2013/188543
PCT Pub. Date: Dec. 19, 2013

(65) Prior Publication Data
US 2015/0183989 A1    Jul. 2, 2015

Related U.S. Application Data

(60) Provisional application No. 61/658,657, filed on Jun. 12, 2012.

(51) Int. Cl.
| | | |
|---|---|---|
| *C08L 75/08* | (2006.01) | |
| *B29C 47/00* | (2006.01) | |
| *B29D 23/00* | (2006.01) | |
| *C08L 51/06* | (2006.01) | |

(52) U.S. Cl.
CPC .......... *C08L 75/08* (2013.01); *B29C 47/0023* (2013.01); *B29D 23/00* (2013.01); *C08L 51/06* (2013.01); *C08L 2201/10* (2013.01); *C08L 2205/03* (2013.01); *C08L 2205/08* (2013.01); *C08L 2207/04* (2013.01); *C08L 2207/066* (2013.01)

(58) Field of Classification Search
CPC .......... C08L 75/08; C08L 75/04; C08L 75/06; C08L 75/10
USPC ....................................................... 525/123
See application file for complete search history.

(56) References Cited

U.S. PATENT DOCUMENTS

| | | | |
|---|---|---|---|
| 3,903,351 A | 9/1975 | Ando et al. | |
| 4,179,479 A | 12/1979 | Carter, Jr. | |
| 4,517,319 A * | 5/1985 | Reske | .......... C08K 3/0033 523/200 |
| 4,946,906 A * | 8/1990 | Yano | .......... C08G 18/4036 524/542 |
| 5,135,805 A | 8/1992 | Sellers et al. | |
| 5,310,822 A | 5/1994 | Kielhorn-Bayer et al. | |
| 5,318,813 A | 6/1994 | Flexman, Jr. | |
| 5,430,121 A | 7/1995 | Pudleiner et al. | |
| 5,585,152 A | 12/1996 | Tamura et al. | |
| 5,952,424 A | 9/1999 | Schultze | |
| 6,133,466 A | 10/2000 | Edelmann et al. | |
| 6,142,189 A | 11/2000 | Bhattacharyya | |
| 6,312,824 B1 | 11/2001 | Philippoz et al. | |
| 6,491,994 B1 | 12/2002 | Kito et al. | |
| 6,807,988 B2 | 10/2004 | Powell et al. | |
| 7,281,547 B2 | 10/2007 | Cleveland et al. | |
| 7,579,058 B2 | 8/2009 | Dowe et al. | |
| 8,008,390 B2 * | 8/2011 | Gunnewig | .......... C08L 75/08 523/200 |
| 2001/0049415 A1 | 12/2001 | Kim et al. | |
| 2002/0100516 A1 | 8/2002 | Powell et al. | |
| 2003/0167051 A1 * | 9/2003 | Zhou | .......... A61L 29/049 604/523 |
| 2005/0043492 A1 * | 2/2005 | Chin | .......... C08K 5/1539 525/455 |
| 2005/0227786 A1 | 10/2005 | Sullivan et al. | |
| 2006/0127620 A1 | 6/2006 | Fisher | |
| 2006/0149000 A1 | 7/2006 | Ikuta et al. | |
| 2006/0189754 A1 | 8/2006 | Serhatkulu et al. | |

(Continued)

FOREIGN PATENT DOCUMENTS

| | | |
|---|---|---|
| AU | 21487/70 | 10/1970 |
| CA | 248333 A1 | 6/2005 |

(Continued)

OTHER PUBLICATIONS

Dupont. Delrin: acetal resin. Module III. Evidentiary reference. Available online at http://www2.dupont.com/Plastics/en_US/assets/downloads/design/DELDGe.pdf.*
English language abstract not found for CN1605668; however, see English language equivalent CA2483333. Original document extracted espacenet.com on Jan. 28, 2014, 12 pages.
English language abstract for CN101067467 extracted from espacenet.com database on Jan. 28, 2014, 1 page.
English language abstract not found for DE 4124892; however, see English language equivalent US5135805. Original document extracted espacenet.com on Mar. 6, 2012, 6 pages.
Research Progress of Compatibilizing Modification of Polyuoxymethlene Alloys, Sun Hongli, Yuan, Huilin, Engineerying Plastics Applications vol. 37, p. 83-86, Dec. 31, 2009.
English language abstract and machine-assisted English translation for DE10230020 extracted from espacenet.com database on Jan. 7, 2015, 10 pages.

(Continued)

*Primary Examiner* — Mike M Dollinger
(74) *Attorney, Agent, or Firm* — Howard & Howard Attorneys PLLC

(57) ABSTRACT

A thermoplastic polyurethane composition includes a thermoplastic polyurethane (TPU) and a polyoxymethylene. The thermoplastic polyurethane composition comprises 50 to 95 parts by weight of the TPU and 5 to 50 parts by weight of the polyoxymethylene, per 100 parts by weight of the thermoplastic polyurethane composition. The thermoplastic polyurethane composition has an Izod notched impact of greater than 0.5 ftlb/in at −40° C. as determined by ASTM D256 10, Method A, and an elastic modulus of greater than 700 psi at 130° C. as determined by ASTM D412. A fluid transfer tube is formed from the thermoplastic polyurethane composition.

20 Claims, No Drawings

(56) References Cited

U.S. PATENT DOCUMENTS

| | | |
|---|---|---|
| 2006/0258805 A1 | 11/2006 | Breulmann et al. |
| 2007/0060715 A1 | 3/2007 | Muck et al. |
| 2011/0046306 A1 | 2/2011 | Serhatkulu |
| 2012/0276314 A1* | 11/2012 | Latz .................. C08G 18/0895 428/35.7 |
| 2016/0260516 A1* | 9/2016 | Schaefer ............ C08G 18/4854 |

FOREIGN PATENT DOCUMENTS

| | | |
|---|---|---|
| CN | 1589295 A | 3/2005 |
| CN | 1605668 A | 4/2005 |
| CN | 101067467 A | 11/2007 |
| DE | 4124892 A1 | 3/1992 |
| DE | 10230020 A1 | 1/2003 |
| DE | 102006036539 A1 | 2/2008 |
| EP | 0038881 A1 | 11/1981 |
| EP | 0116456 A1 | 8/1984 |
| EP | 0117664 A1 | 9/1984 |
| EP | 0247870 A1 | 12/1987 |
| EP | 0276080 A1 | 7/1988 |
| EP | 0657505 A1 | 6/1995 |
| EP | 0978525 A2 | 2/2000 |
| GB | 2347933 A | 9/2000 |
| JP | 2005219000 A | 8/2005 |
| WO | 03/050187 A1 | 6/2003 |
| WO | WO2009132947 A1 | 11/2009 |
| WO | WO2010076225 A1 | 7/2010 |

OTHER PUBLICATIONS

English language abstract and machine-assisted English translation for DE102006036539 extracted from espacenet.com database on Jan. 7, 2015, 17 pages.

English language abstract for EP0978525 extracted from espacenet.com database on Mar. 6, 2012, 2 pages.

English language abstract and machine-assisted English translation for JP2005-219000 extracted from PAJ database, 15 pages.

International Search Report for PCT/EP2009/054292 dated Sep. 14, 2009, 3 pages.

International Search Report for PCT/EP2009/067311 dated Apr. 12, 2010, 3 pages.

International Search Report for PCT/US2013/045423 dated Oct. 8, 2013.

Hui, Cai, Development of Rubber Plastic Composition Soft Tubes Knitted with Steal Wires:, China Rubber, No. 2, 1997, (No. 290). The article is in Chinese.

Gao, Xiaoling et al. "Toughening Mechanism in Polyoxymethylene/ Thermoplastic Polyurethane Blends", Polymer International, No. 53, 2004, pp. 1666-1671.

Ryan, Kevin J. et al., "Ultra-High-Molecular-Weight-Functional Siloxane Additives in Polymers, Effects on Processing and Properties", Journal of Vinyl & Additive Technology, Mar. 2000, vol. 6, No. 1, pp. 7-19.

* cited by examiner

THERMOPLASTIC POLYURETHANE COMPOSITION

CROSS-REFERENCE TO RELATED APPLICATIONS

This application is the National Stage of International Patent Application No. PCT/US2013/045423, filed on Jun. 12, 2013, which claims the benefit of and priority to and all the advantages of U.S. Provisional Patent Application No. 61/658,657, filed on Jun. 12, 2012, the content of which is incorporated herein by reference in its entirety.

FIELD OF THE INVENTION

The instant invention generally relates to a thermoplastic polyurethane composition, a method of making the thermoplastic polyurethane composition, and a fluid transfer tube formed from the thermoplastic polyurethane composition. More specifically, the instant invention relates to a thermoplastic polyurethane composition which can be used in lieu of polyamide.

DESCRIPTION OF THE RELATED ART

Thermoplastic polyurethane compositions (TPU compositions) are known in the art and can be used in a variety of products. TPU compositions typically include thermoplastic polyurethane (TPU), fillers, and additives. TPUs are typically multi-block copolymers with hard and soft segments that can be produced by a poly-addition reaction of an isocyanate with a linear polymer glycol and a low molecular weight diol as a chain extender. Usually, the soft segments form an elastomer matrix which gives the TPUs elastic properties. The hard segments typically act as multifunctional tie points that function both as physical crosslinks and reinforcing fillers. TPUs are known in the art for toughness, low temperature flexibility, strength, abrasion resistance, transparency, and chemical resistance. These physical properties can be tailored to different end uses by adjusting a nature and an amount of the isocyanate, the linear polymer glycol, and/or the low molecular weight diol.

Although TPUs typically have many desirable physical properties, many TPUs also have physical properties that render them unsuitable for use in certain applications. For example, TPUs may exhibit insufficient physical properties such as low softening point, tensile strength, elongation at break, tear strength, and modulus, especially at higher temperatures. To this end, articles formed from TPU compositions may have insufficient abrasion resistance, i.e., an ability to withstand mechanical action such as rubbing, scraping, or erosion. Some articles formed from TPU compositions may simply not be durable enough at higher temperatures. For example, TPUs compositions are not traditionally used in various hose applications subject to elevated environmental and fluid temperatures. Presently, many of these hose applications utilize other polymeric compositions including polymers such as polyamide, e.g. Nylon 11 and Nylon 12, which typically have sufficient physical properties at higher temperatures.

When using TPU compositions, polymers in addition to TPU are sometimes included to improve physical properties. For example, it is known in the art to blend TPUs and polyoxymethylene (POM) to improve impact resistance. In this instance, TPU is typically blended in amounts of 40% by weight or less and POM is typically blended in amounts of 60% by weight or greater, based on the total weight of the TPU and POM. Further, in many cases the addition of a second polymer or filler to the blends of TPU and POM is also needed in order to obtain the desired impact resistance.

SUMMARY OF THE INVENTION AND ADVANTAGES

A thermoplastic polyurethane composition (TPU composition) including a thermoplastic polyurethane (TPU) and a polyoxymethylene is disclosed. The TPU composition comprises 50 to 95 parts by weight of the TPU and 5 to 50 parts by weight of the polyoxymethylene, per 100 parts by weight of the TPU composition. The TPU composition has an Izod notched impact of greater than 0.5 ft·lb/in at −40° C. as determined by ASTM D256 10, Method A, and an elastic modulus of greater than 700 psi at 130° C. as determined by ASTM D412. A fluid transfer tube comprising the TPU composition is also disclosed.

The TPU composition of the subject disclosure exhibits excellent physical properties, such as a relatively high softening point, tensile strength, elongation at break, tear strength, elastic modulus, and flexural modulus, over a wide range of temperatures. More specifically, the TPU composition maintains excellent low temperature properties, such as Izod notched impact at −40° C., yet has excellent room temperature and elevated temperature properties, such as tensile strength, elongation at break, tear strength, elastic modulus, and flexural modulus, at 23° C. and 130° C. These physical properties allow the TPU composition to be used in lieu of other polymers, e.g. polyamide, to form articles such as fluid (e.g., liquid, gas, plasma, etc.) transfer tubes and cable jackets. Further, it is believed that the polyurethane composition of the subject disclosure can be used in applications where other polymers, e.g. polyamide, are not suitable for use, such as in sub-zero applications including food packaging films, ski boots, etc.

DETAILED DESCRIPTION OF THE INVENTION

The instant disclosure provides a thermoplastic polyurethane composition (TPU composition), a method of forming a fluid transfer tube, and a fluid transfer tube formed from the thermoplastic composition. The TPU composition includes thermoplastic polyurethane (TPU) and an acetal polymer, such as polyoxymethylene. The TPU composition is typically free from cells characteristic of foams, and is typically formed in the absence of cell formation through action of blowing agents.

Although a wide variety of TPUs can be formed by varying the structure and/or molecular weight of the reactants used to form TPUs, the TPU of the subject disclosure is engineered for use with the polyoxymethylene in the TPU composition. The TPU is typically selected from the group of polyester-based TPUs, polyether-based TPUs, and combinations thereof. For purposes of the subject disclosure, a "polyester-based" TPU is a TPU that includes at least two ester groups present therein and/or is formed from a reactant that includes a polyester bond. Likewise, also for purposes of the instant application, a "polyether-based" TPU is a TPU that includes at least two ether groups present therein and/or is formed from a reactant that includes a polyether bond. It is to be appreciated that for both polyester-based and polyether-based TPUs, reactants can be used to form the TPUs that do not include polyester or polyether groups therein. Further, it is also to be appreciated that suitable TPUs for purposes of this disclosure are not limited to polyester-based or polyether-based TPUs, and that other TPUs may also be suitable that do not include ether or ester groups present therein.

The TPU typically comprises the reaction product of a polyol and an isocyanate. In one embodiment, the TPU is the polyester-based TPU and includes the reaction product of a polyester polyol and an isocyanate. Suitable polyester polyols may be produced from a reaction of a dicarboxylic acid and a glycol having at least one primary hydroxyl group. Suitable dicarboxylic acids may be selected from the group of, but are not limited to, adipic acid, methyl adipic acid, succinic acid, suberic acid, sebacic acid, oxalic acid, glutaric acid, pimelic acid, azelaic acid, phthalic acid, terephthalic acid, isophthalic acid, and combinations thereof. Glycols that are suitable for use in producing the polyester polyols may be selected from the group of, but are not limited to, ethylene glycol, butylene glycol, hexanediol, bis(hydroxymethylcyclohexane), 1,4-butanediol, diethylene glycol, 2,2-dimethyl propylene glycol, 1,3-propylene glycol, and combinations thereof.

In a further embodiment, the TPU is a polyether-based TPU and includes the reaction product of a polyether polyol and an isocyanate. Suitable polyether polyols may be selected from the group of, but are not limited to, polytetramethylene glycol, polyethylene glycol, polypropylene glycol, and combinations thereof.

In an alternative embodiment, the TPU further includes the reaction product of a chain extender, in addition to the polyester polyols or polyether polyols in the polyester-based or polyether-based TPUs, respectfully. In yet another alternative embodiment, the TPU may comprise the reaction product of the chain extender and the isocyanate in the absence of polyester polyols and/or polyether polyols. Suitable chain extenders may be selected from the group of, but are not limited to, diols including ethylene glycol, propylene glycol, butylene glycol, 1,4-butanediol, butenediol, butynediol, xylylene glycols, amylene glycols, 1,4-phenylene-bis-beta-hydroxy ethyl ether, 1,3-phenylene-bis-beta-hydroxy ethyl ether, bis-(hydroxy-methyl-cyclohexane), hexanediol, and thiodiglycol; diamines including ethylene diamine, propylene diamine, butylene diamine, hexamethylene diamine, cyclohexalene diamine, phenylene diamine, tolylene diamine, xylylene diamine, 3,3'-dichlorobenzidine, and 3,3'-dinitrobenzidine; alkanol amines including ethanol amine, aminopropyl alcohol, 2,2-dimethyl propanol amine, 3-aminocyclohexyl alcohol, and p-aminobenzyl alcohol; and combinations of any of the aforementioned chain extenders.

Typically, the polyol used to form the TPU has a weight average molecular weight of from 600 to 2,500 g/mol. It is to be appreciated that when multiple polyols are used to form the TPUs, each of the polyols typically has a weight average molecular weight within the above range. However, the polyol used to form the TPU is not limited to this molecular weight range.

The isocyanate that is used to form the TPU may be a polyisocyanate having two or more functional groups, e.g. two or more NCO functional groups. The isocyanate may include, but is not limited to, monoisocyanates, diisocyanates, polyisocyanates, biurets of isocyanates and polyisocyanates, isocyanurates of isocyanates and polyisocyanates, and combinations thereof. In one embodiment, the isocyanate includes an n-functional isocyanate. In this embodiment, n is a number typically from 2 to 5, more typically from 2 to 4, and most typically from 2 to 3. It is to be understood that n may be an integer or may have intermediate values from 2 to 5. The isocyanate may include an isocyanate selected from the group of aromatic isocyanates, aliphatic isocyanates, and combinations thereof. In another embodiment, the isocyanate includes an aliphatic isocyanate such as hexamethylene diisocyanate, H12MDI, and combinations thereof. If the isocyanate includes an aliphatic isocyanate, the isocyanate may also include a modified multivalent aliphatic isocyanate, i.e., a product which is obtained through chemical reactions of aliphatic diisocyanates and/or aliphatic polyisocyanates. Examples include, but are not limited to, ureas, biurets, allophanates, carbodiimides, uretonimines, isocyanurates, urethane groups, dimers, trimers, and combinations thereof. The isocyanate may also include, but is not limited to, modified diisocyanates employed individually or in reaction products with polyoxyalkyleneglycols, diethylene glycols, dipropylene glycols, polyoxyethylene glycols, polyoxypropylene glycols, polyoxypropylene polyoxyethylene glycols, polyesterols, polycaprolactones, and combinations thereof.

Alternatively, the isocyanate may include an aromatic isocyanate. If the isocyanate includes an aromatic isocyanate, the aromatic isocyanate may correspond to the formula $R'(NCO)_z$ wherein $R'$ is aromatic and $z$ is an integer that corresponds to the valence of $R'$. Typically, $z$ is at least two. Suitable examples of aromatic isocyanates include, but are not limited to, tetramethylxylylene diisocyanate (TMXDI), 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof. Alternatively, the aromatic isocyanate may include a triisocyanate product of m-TMXDI and 1,1,1-trimethylolpropane, a reaction product of toluene diisocyanate and 1,1,1-trimethyolpropane, and combinations thereof. In one embodiment, the isocyanate includes a diisocyanate selected from the group of methylene diphenyl diisocyanate, toluene diisocyanate, hexamethylene diisocyanate, H12MDI, and combinations thereof.

In one embodiment, the isocyanate has a maximum 85.7 wt % of NCO content. The isocyanate may also react with the polyol and/or chain extender in any amount, as determined by one skilled in the art. Typically, the isocyanate and the polyol and/or chain extender are reacted at an isocyanate index of from 90 to 115, more typically from 95 to 105, and most typically from 105 to 110.

Referring now to the TPU, the TPU typically has: a weight average molecular weight of greater than 50,000, more typically from 50,000 to 400,000, and most typically from 75,000 to 200,000, g/mol; a softening point of greater than 150 and more typically greater than 160, ° C. as determined by ASTM D1525-09; a melting point of from 210 to 225° C.; a Shore D Hardness of from 51 to 75 pts as determined by ASTM D2240; and a specific gravity of from 1.1 to 1.3, more typically from 1.13 to 1.23, and most typically from 1.16 to 1.20 g/cm³. In one embodiment, the TPU has a Shore D Hardness of from 51 to 55 and a specific gravity of from 1.15 to 1.17. In another embodiment, the TPU has a Shore D Hardness of from 71 to 75 and a specific gravity of from 1.18 to 1.20.

Further, the TPU typically has: a tensile strength of from 2,000 to 10,000 and more typically of from 3,000 to 9,000, psi at 23° C. as determined by ASTM D412; a Taber abrasion resistance of from 50 to 100 and more typically from 65 to 85, mg when tested in accordance with ASTM D1044; and a tear strength of greater than 800 and more typically greater than 950, pli at 23° C. as determined by ASTM D624, Die C. Specific examples of suitable TPUs include, but are not limited to, ELASTOLLAN® TPUs commercially available from BASF Corporation.

Of course, it is contemplated that the TPU composition may include one or more TPUs. When more than one TPU is included in the TPU composition, greater than one TPU meets the description of the TPUs set forth above, and the additional TPUs are not limited to any particular TPU but typically include a polyether-based TPU and/or a polyester-based TPU.

The TPU is typically present in the TPU composition in an amount of from 50 to 95, more typically in an amount from 51 to 95, still more typically in an amount from 55 to 90, still more typically in an amount from 60 to 90, and most typically from 65 to 85, parts by weight per 100 parts by weight of the TPU composition. When the TPU composition includes more than one TPU, the total amount of TPU present in the TPU composition is within the above ranges.

In one embodiment, a single, polyether-based TPU is present in the TPU composition in an amount of from 70 to 85 parts by weight per 100 parts by weight of the TPU composition. In this embodiment, the polyether-based TPU has a Shore D Hardness of from 51 to 55 and a specific gravity of from 1.15 to 1.17.

In another embodiment, a single, polyether-based TPU is present in the TPU composition in an amount of from 70 to 85 parts by weight per 100 parts by weight of the TPU composition. In this embodiment, the TPU has a Shore D Hardness of from 71 to 75 and a specific gravity of from 1.18 to 1.20.

In addition to the TPU, the TPU composition also includes the acetal polymer. As described above, and without being bound to any particular theory, it is believed that the acetal polymer provides the TPU composition with improved physical properties at higher temperatures. The acetal polymer may be further defined as a homopolymer, a copolymer, or a mixture of homopolymers and copolymers. Typically, the acetal polymer is further defined as a polyoxymethylene. The polyoxymethylene may be further defined as a homopolymer, a copolymer, or a mixture of homopolymers and copolymers. The polyoxymethylene may be further defined as a polyoxymethylene homopolymer (—(—O—CH$_2$—)$_n$—) wherein n may be any number greater than 1. As is known in the art, homopolymers of polyoxymethylene are typically synthesized by polymerizing anhydrous formaldehyde by anionic catalysis and then stabilized by reaction with acetic anhydride. As another example, the polyoxymethylene may be a polyoxymethylene copolymer. As is also known in the art, copolymers of polyoxymethylene may be synthesized by converting formaldehyde to trioxane via acid catalysis and then reacting the trioxane with dioxolane or ethylene oxide to form the copolymer using acid catalysts.

Typically, the polyoxymethylene has: a weight average molecular weight of greater than 50,000, more typically from 50,000 to 250,000, and most typically from 100,000 to 200,000, g/mol; a melting point of greater than 160 and more typically greater than 165, ° C.; a tensile strength (yield) of from 8,000 to 11,000, more typically from 8,500 to 10,500, and most typically from 9,000 to 10,000, psi at 23° C. as determined by ASTM D638; an elongation (yield) at 23° C. of from 2 to 20, more typically from 5 to 15, and most typically from 8 to 10, % as determined by ASTM D638; a flexural modulus at 23° C. of from 300,000 to 400,000 more typically from 325,000 to 75,000, and most typically from 355,000 to 365,000, psi as determined by ASTM D790; a Izod notched impact of from 1 to 2, and more typically from 1.2 to 1.4, ft·lb/in at 23° C. as determined by ASTM D256; and a Izod notched impact at −40° C. of from 1 to 2, and more typically from 1.0 to 1.3, ft·lb/in as determined by ASTM D256. In one embodiment, the polyoxymethylene has melting point of about 166° C. In another embodiment, the polyoxymethylene has a tensile strength of from 9,000 to 10,000 psi at 23° C. as determined by ASTM D638. Examples of suitable polyoxymethylenes that may be used include, but are not limited to, are ULTRAFORM® polyoxymethylenes, commercially available from BASF Corporation.

The polyoxymethylene is typically present in the TPU composition in an amount of from 5 to 50, still more typically from 5 to 49, still more typically from 5 to 45, still more typically from 5 to 40, still more typically from 10 to 35, and most typically from 13 to 32, parts by weight per 100 parts by weight of the TPU composition. Further, it is to be appreciated that more than one polyoxymethylene may be included in the TPU composition, in which case the total amount of all polyoxymethylenes present in the TPU composition is within the above ranges. Generally speaking, if more than 50 parts by weight polyoxymethylene are present in the TPU composition, the low temperature properties (i.e., Izod at −40° C.) of the TPU composition will start to decline. For example, when tested for Izod notched impact at −40° C. in accordance with ASTM D256-10 (Method A), test specimens formed from a TPU composition comprising greater than 50 parts by weight polyoxymethylene may break.

In addition to the TPU and the acetal polymer, the TPU composition may include a cross-linking agent that reacts with the TPU to form cross-links, i.e., to form cross-linked TPU. The cross-linking agent reacts with the TPU to create a reinforced polymer network. The cross-linking agent comprises a thermoplastic polyurethane carrier, which is different than the TPU, and an isocyanate component. The cross-linking agent typically includes less than 60 parts by weight of the thermoplastic polyurethane carrier and typically less than 48 parts by weight of the isocyanate component, based on 100 parts by weight of the cross-linking agent.

The isocyanate component of the cross-linking agent includes at least one isocyanate. Isocyanates suitable for use in the isocyanate component include, but are not limited to, aliphatic and aromatic isocyanates. In various embodiments, the isocyanate is selected from the group of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof.

The isocyanate component of the cross-linking agent may include an isocyanate prepolymer. The isocyanate prepolymer is typically a reaction product of an isocyanate and a polyol and/or a polyamine. The isocyanate used in the prepolymer can be any isocyanate as described above. The polyol used to form the prepolymer is typically selected from the group of ethylene glycol, diethylene glycol, propylene glycol, dipropylene glycol, butane diol, glycerol, trimethylolpropane, triethanolamine, pentaerythritol, sorbitol, biopolyols, and combinations thereof. The polyamine used to form the prepolymer is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof.

In one embodiment, the cross-linking agent comprises the thermoplastic polyurethane carrier and the isocyanate component comprises the isocyanate prepolymer, diphenylmethane-4,4'-disocyanate (MDI), and MDI mixed isomers. In this embodiment, the cross-linking agent includes less than 60 parts by weight of the thermoplastic polyurethane carrier, less than 25 parts by weight of the isocyanate prepolymer, 20 parts by weight MDI, and less than 3 parts by weight MDI mixed isomers, based on 100 parts by weight of the cross-linking agent.

When the TPU includes the cross-linking agent, the cross-linking agent is typically present in the TPU composition in an amount of 1 to 15 and more typically from 3 to 8, parts by weight per 100 parts by weight of the TPU composition. Examples of cross-linking agents that may be used include, but are not limited to, ELASTOLLAN X-FLEX® products commercially available from BASF Corporation. The cross-linking agent contains isocyanate groups that react with the TPU creating a reinforced network.

In addition to the TPU and the acetal polymer, the TPU composition may include a compatibilizer which helps compatibilize the TPU and the acetal polymer thus promoting homogeneity of the TPU composition which, in turn, optimizes the physical properties of the TPU composition. Typically, the compatibilizer is an anhydride-functional compatibilizer. More typically, the compatibilizer is a maleic anhydride functional polyethylene or polypropylene based compatibilizer. The maleic anhydride functionality improves the interfacial interaction between the TPU and the acetal polymer, e.g., the polyoxymethylene, which typically results in a more homogenous blend of the TPU and the polyoxymethylene. In one embodiment, the compatibilizer is a low density polyethylene (LDPE) based maleic anhydride grafted compatibilizer.

In addition to the TPU and the acetal polymer, the TPU composition may also include one or more additives selected from the group of anti-foaming agents, processing additives, plasticizers, chain terminators, surface-active agents, adhesion promoters, flame retardants, anti-oxidants, water scavengers, fumed silicas, dyes, ultraviolet light stabilizers, fillers, thixotropic agents, transition metals, catalysts, blowing agents, surfactants, cross-linkers, inert diluents, and combinations thereof. Some particularly suitable additives include, but are not limited to, carbodiimides to reduce hydrolysis, hindered phenols and hindered amine light stabilizers to reduce oxidation and yellowing, benzotriazoles to increase UV light stabilization, glass fillers, and salts of sulfonic acid to increase antistatic properties of the TPU composition. The additive(s) may be included in any amount as desired by those of skill in the art.

As used herein, "consisting essentially of" is meant to exclude any element or combination of elements, as well as any amount of any element or combination of elements, that would alter the basic and novel characteristics of the TPU composition such as fillers, plasticizers, and polyamides. In one embodiment, the TPU composition consists essentially of the TPU and the polyoxymethylene. In another embodiment, the TPU composition consists essentially of the TPU, the polyoxymethylene, and the cross-linking agent. In yet another embodiment, the TPU composition consists essentially of the TPU, the polyoxymethylene, and the compatibilizer. In still another embodiment, the TPU composition consists essentially of the TPU, the polyoxymethylene, the cross-linking agent, and the compatibilizer.

The TPU composition may be substantially free from other polymers known in the art (including polyamide), fillers known in the art (including reinforcing fillers), and plasticizers known in the art. The terminology "substantially free," as used immediately above, refers to an amount of less than 0.1, more typically of less than 0.01, and most typically of less than 0.001, parts by weight per 100 parts by weight of the polyamide composition.

Typically, the TPU composition has a specific gravity of from 1.05 to 1.35, more typically from 1.11 to 1.25, and most typically from 1.15 to 1.21, g/cm$^3$ as determined by ASTM D792. In one embodiment, the TPU composition has a density of about 1.15 g/cm$^3$. The TPU composition also typically has a Shore D hardness of from 50 to 100, more typically from 55 to 90, and most typically from 60 to 80, pts as determined by ASTM D2240. In another embodiment, the TPU composition has a Shore D hardness of from 62 to 67. In yet another embodiment, the TPU composition has a Shore D hardness of from 72 to 80.

Furthermore, the TPU composition typically has a DIN abrasion loss of from 5 to 50, more typically from 10 to 40, and most typically from 15 to 35, mm$^3$ as determined by DIN 53516. The TPU composition also typically has a tensile strength of greater than 3,500 more typically from 5,000 to 9,000, and most typically from 5,500 to 8,000, psi at 23° C. as determined by ASTM D412. In an additional embodiment, the TPU composition has a tensile strength of about 7,500 psi at 23° C. Further, the TPU composition typically has a tensile strength of greater than 175, more typically from 150 to 600, and most typically from 200 to 550, psi at 130° C. as determined by ASTM D412. In another additional embodiment, the TPU composition has a tensile strength of about 200 psi at 130° C. The TPU composition typically has an elongation at break of greater than 140, more typically from 150 to 500, and most typically from 170 to 550, percent at 23° C. as determined by ASTM D412. In a further embodiment, the TPU composition has an elongation at break of about 400 percent. The TPU composition typically has a tear strength of greater than 900, more typically greater than 1,200, and most typically greater than 1,500, pli at 23° C. as determined by ASTM D624, Die C. The TPU composition typically has an elastic modulus of from 20,000 to 75,000 and more typically from 24,000 to 71,000, psi at 23° C. as determined by ASTM D412. In still a further embodiment, the TPU composition has an elastic modulus of about 38,000 psi at 23° C. The TPU composition typically has an elastic modulus of greater than 700, more typically from greater than 1,200, and most typically, greater than 2,500, psi at 130° C. as determined by ASTM D412. In still another further embodiment, the TPU composition has an elastic modulus of about 1,200 percent at 130° C. The TPU composition typically has a flexural modulus of greater than 40,000, more typically from 40,000 to 150,000, and most typically from 44,000 to 145,000 psi at 23° C. as determined by ASTM D790. In yet another embodiment, the TPU composition typically has a flexural modulus of about 80,000 psi at 23° C. The TPU composition typically has a flexural modulus of greater than 2,000, more typically from 2,000 to 20,000, and most typically from 4,000 to 15,000, psi at 130° C. as determined by ASTM D790. In still yet another embodiment, the TPU composition has an elastic modulus of about 10,000 psi at 130° C.

In addition to the excellent high temperature performance set forth above, the low temperature performance of the TPU composition is also excellent. The TPU composition has an Izod notched impact of greater than 0.5, alternatively greater than 0.9, alternatively greater than 2.0, and alternatively greater than 2.5, ft·lb/in at −40° C. as determined by ASTM D256-10 (Method A). In various embodiments, when the TPU composition is tested for Izod notched impact at −40° C. in accordance with ASTM D256-10 (Method A), a majority of test specimens do not break. In other embodiments, when the TPU composition is tested for Izod notched impact at −40° C. in accordance with ASTM D256-10 (Method A), all test specimens do not break.

In addition to the TPU composition, the instant disclosure also provides a method of forming the TPU composition. The method of forming the TPU composition includes the step of combining the TPU, the polysiloxane, and acetal polymer, and the ABS copolymer to form the TPU composition. The step of combining may occur through any method known in the art including, but not limited to, direct extrusion, belt extrusion, reaction extrusion, reaction injection molding, vertical mixing, horizontal mixing, feed mixing, and combinations thereof. In one embodiment, the step of combining is further defined as feeding the TPU and the acetal polymer into a compounding device such as a single or twin-screw extruder.

The method of forming the TPU composition may also include the step of heating the TPU and the acetal polymer while in the compounding device, outside of the compounding device, or both outside of the compounding device and in the compounding device. It is to be appreciated that the TPU and the acetal polymer are typically heated to a temperature of from 180 to 260 and more typically from 180 to 220, ° C. It is believed that the heating promotes compounding of the TPU and the acetal polymer. It is also contemplated that the method may include the step of tempering the TPU composition.

Subsequent to the step of combining, the method of forming the TPU composition may also include the step of pelletizing, dicing, or granulating the TPU composition. For example, the compounded TPU composition may be pelletized with an underwater pelletizer or a strand pelletizer.

In one embodiment, after formation of the TPU composition in the compounding device, the TPU composition is extruded on a twin-screw extruder and pelletized, diced, or granulated upon discharge. In another embodiment, the TPU and the acetal polymer are fed into a twin screw extruder and the TPU composition is extruded at a temperature of less than or equal to about 210° C. to form a fluid transfer tube.

As described above, the instant disclosure also provides an article, such as a fluid transfer tube formed from the TPU composition. As used herein, the term fluid describes liquids, gases, and plasmas. However, the article is not limited to fluid transfer tubes. That is, the article may be any known in the art including, but not limited to, hose jacketing, wire and cable jacketing, wheels and caster tires, conveyor belts, mechanical goods, sporting goods, appliances and furniture, animal tags, golf ball, and disc covers.

The fluid transfer tube comprising the TPU composition is durable and strong over a wide range of temperatures and resists kinking. Kinking is determined using a method well known in the coiled tube industry and art. This method utilizes a fluid transfer tube having an inner surface that is circumferential and that has an 8 mm diameter and an outer surface that is circumferential and that has a 12 mm diameter. In this method, the fluid transfer tube is coiled in approximate circles of decreasing diameter until the fluid transfer tube kinks. The method defines a kink as occurring when 10 percent of the outside diameter of the fluid transfer tube is flattened. At this point, the diameter of the approximate circle of the coil is recorded. The fluid transfer tube of this disclosure typically remains kink free when coiled to form an approximate circle having a diameter of from 3 to 6 cm, more typically of from 4 to 5 cm, and most typically of about 4 cm.

As described above, the instant disclosure also provides a method of forming the fluid transfer tube. The method of forming the fluid transfer tube comprises the steps of combining the TPU and the polyoxymethylene to form the TPU composition and extruding the TPU composition to form the fluid transfer tube.

Of course, it is to be understood that the aforementioned physical properties and dimensions are not limiting and only describe some embodiments of this disclosure.

The instant disclosure also provides a method of forming the fluid transfer tube. The method includes the step of extruding the TPU and the acetal polymer to form the fluid transfer tube. The step of extruding may be further defined as simultaneously extruding the TPU and the acetal polymer from a single extruder or from different extruders. Alternatively, the step of extruding may be further defined as extruding the TPU and the acetal polymer at different times from the same extruder or from different extruders. The extruder is typically a single or twin-screw extruder but may be any extruder known in the art. The conditions of extruding may be any known in the art.

The present invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the present invention may be practiced otherwise than as specifically described.

EXAMPLES

Thermoplastic polyurethane composition 1-7 (TPU Compositions 1-7) are formed according to the instant disclosure by compounding thermoplastic polyurethane (TPU), a polyoxymethylene, and a compatibilizer on a single screw extruder Immediately following compounding/extrusion the TPU Compositions are pelletized. Once pelletized, the TPU Compositions are injection molded into test plaques using a process well known in the art. The test plaques are analyzed to determine the key physical/performance properties of the TPU Compositions. Comparative plaques, formed from materials not in accordance with the subject disclosure, are also analyzed and the results are included for comparative purposes.

Referring now to Table 1, the amount and type of each component used to form TPU Compositions 1-7 is indicated with all values in parts by weight based on 100 parts by weight of the total TPU Composition.

TABLE 1

|  | TPU Comp. 1 | TPU Comp. 2 | TPU Comp. 3 | TPU Comp. 4 | TPU Comp. 5 | TPU Comp. 6 | TPU Comp. 7 |
| --- | --- | --- | --- | --- | --- | --- | --- |
| TPU A | 83.3 | 79.4 | 68.6 | 65.4 | — | — | — |
| TPU B | — | — | — | — | 83.3 | 68.6 | 65.4 |
| Cross-linking agent | — | 4.7 | — | 4.7 | — | — | 4.7 |
| Polyoxymethylene | 14.7 | 14.0 | 29.4 | 28.0 | 14.7 | 29.4 | 28.0 |
| Compatibilizer | 2.0 | 1.9 | 2.0 | 1.9 | 2.0 | 2.0 | 1.9 |

TPU A is a polyether-based aromatic TPU having a tensile strength of 40 MPa at 23° C. as determined by ASTM D412, a Shore D Hardness of 53 pts as determined by ASTM D2240, and a specific gravity of 1.16 g/cm³.

TPU B is a polyether-based aromatic TPU having a tensile strength of 45 MPa at 23° C. as determined by ASTM D412, a Shore D Hardness of 73 pts as determined by ASTM D2240, and a specific gravity of 1.19 g/cm³.

Cross-linking agent is ELASTOLLAN® X-FLEX 2905 MB, commercially available from BASF Corporation.

Polyoxymethylene is a high molecular weight polyoxymethylene having a tensile modulus of 65 MPa at 23° C. as determined by ASTM D412 and a specific gravity of 1.4 g/cm³.

Compatibilizer is a low density polyethylene (LDPE) based maleic anhydride grafted compatibilizer.

TPU Compositions 1-7 are compounded and extruded into strands on a single-screw extruder. During extrusion, a single screw rotates at a certain speed (RPM) in a metal barrel to compound and push the TPU Composition through the barrel. The barrel provides a bearing surface where shear is imparted to the TPU Composition. Heating media are housed around the barrel and establish temperature zones in the barrel that are varied according to processing conditions known to those of skill in the art. The process parameters under which TPU Compositions 1-7 are compounded are set forth in Table 2 below. Components are fed into the single-screw extruder in a first zone (Zone 1) and passed through a series of additional zones (Zones 2-6) that are heated to varying temperatures. Then, the TPU Compositions are pushed through a strand die to form the strands which are cooled with water and pelletized. TPU Compositions 1-7, now pelletized, are subsequently molded into plaques using the injection molding process described below.

TABLE 2

| Zone 1 Temperature (° C.) | 210 |
| --- | --- |
| Zone 2 Temperature (° C.) | 220 |
| Zone 3 Temperature (° C.) | 225 |
| Gate (° C.) | 225 |
| Adapter (° C.) | 225 |
| Die Temperature (° C.) | 225 |
| Torque (psi) | 800 |
| Head Pressure (psi) | 1100 |
| Screw Speed (RPM) | 50 |
| Production Rate (lb./hr.) | 20 |
| Melt Temperature (° C.) | 240 |

TPU Compositions 1-7 and Comparative Compositions 1 and 2 are injection molded under conditions set forth in Table 3 below. Each of the plaques is approximately 5"×4"×0.08".

TABLE 3

| Molding Conditions | TPU Compositions 1-7 | Comparative Composition 1 and 2 |
| --- | --- | --- |
| Nozzle (° C.) | 230 | 230 |
| Zone 1 (° C.) | 230 | 237 |
| Zone 2 (° C.) | 225 | 225 |
| Zone 3 (° C.) | 205 | 210 |
| Mold Temperature (° C.) | 25 | 65 |
| Sprue Temperature (° C.) | 285 | 285 |
| Inj. High (mm) | 2 | 2 |
| Pack Time (sec.) | 10 | 5 |
| Hold Time (sec.) | 10 | 5 |
| Cool Time (sec.) | 10 | 5 |
| Screw Speed (RPM) | 30 | 50 |
| Pack Pressure (psi) | 800 | 900 |
| Hold Pressure (psi) | 700 | 700 |
| Back Pressure (psi) | 50 | 50 |
| Speed (mm/s) | 1 | 2 |
| Transfer Position (mm) | 0.4 | 0.4 |
| Transfer Pressure (psi) | 540 | 1550 |

Comparative Composition 1 (CC1) is Nylon 11.

Comparative Composition 2 (CC2) is Nylon 12.

The plaques of TPU Compositions 1-7 and Comparative Compositions 1 and 2 are tested to determine various physical and performance properties over a range of temperatures. Once formed, the test plaques are analyzed to determine various physical properties. The properties, test methods used, and the results are set forth in Table 4 below.

TABLE 4

|  | TPU Comp. 1 | TPU Comp. 2 | TPU Comp. 3 | TPU Comp. 4 | TPU Comp. 5 | TPU Comp. 6 | TPU Comp. 7 | CC1 | CC2 |
| --- | --- | --- | --- | --- | --- | --- | --- | --- | --- |
| Hardness (Shore D) ASTM D2240 | 63 | 63 | 66 | 64 | 75 | 75 | 77 | 67 | 69 |
| Tensile Strength (psi) ASTM D412, 23° C. | 5898 | 5985 | 5668 | 5699 | 6049 | 5924 | 6582 | 5106 | 4839 |

TABLE 4-continued

| | TPU Comp. 1 | TPU Comp. 2 | TPU Comp. 3 | TPU Comp. 4 | TPU Comp. 5 | TPU Comp. 6 | TPU Comp. 7 | CC1 | CC2 |
|---|---|---|---|---|---|---|---|---|---|
| Tensile Strength (psi) ASTM D412, 130° C. | 176 | 210 | 200 | 370 | 510 | 409 | 337 | — | 269 |
| Elongation - break (%) ASTM D412, 23° C. | 453 | 379 | 429 | 385 | 374 | 420 | 175 | 143 | 154 |
| Elastic modulus (psi) ASTM D412, 23° C. | 24673 | 25217 | 37925 | 33080 | 57696 | 64684 | 70515 | 29401 | 41822 |
| Elastic modulus (psi) ASTM D412, 130° C. | 738 | 729 | 1206 | 1238 | 1433 | 2578 | 2884 | — | 3030 |
| Flexural modulus (psi) ASTM D790, 23° C. | 52500 | 44612 | 87667 | 65000 | 105833 | 136100 | 142300 | 49500 | 67500 |
| Flexural modulus (psi) ASTM D790, 130° C. | 4650 | 2280 | 9900 | 12400 | 7180 | 14700 | 14400 | 18300 | 18100 |
| Izod (ft · lb/in) ASTM D256-10 (Method A) −40° C. | 2.18 | 3.37 | 1.06 | 2.5 | 0.9 | 0.97 | 1.16 | 1.51 | 0.86 |
| VICAT Softening Point (° C.) ASTM D1525-09, 10N | 147 | 166 | 156 | 164 | 152 | 162 | 164 | 179 | 167 |
| Die C Tear Strength (pli) ASTM D624, 20 in/min | — | — | 1568 | — | — | — | — | 1049 | 1159 |

As the results in Table 4 demonstrate, TPU Compositions 1-7 of the instant disclosure exhibit excellent physical properties over a wide range of temperatures. In view of Comparative Compositions 1 and 2, these compositions can be utilized in applications which typically utilize other polymeric materials having higher temperature resistance, such as Nylon (polyamide), to achieve the required performance properties.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the present invention may be practiced otherwise than as specifically described.

What is claimed is:

1. A thermoplastic polyurethane composition comprising:
   60 to 95 parts by weight of a thermoplastic polyurethane, per 100 parts by weight of the thermoplastic polyurethane composition;
   5 to 32 parts by weight of a polyoxymethylene, per 100 parts by weight of the thermoplastic polyurethane composition;
   a compatibilizer comprising maleic anhydride-functional polyethylene or polypropylene; and
   a cross-linking agent which is different than said compatibilizer comprising maleic anhydride-functional polyethylene or polypropylene;
   wherein said thermoplastic polyurethane composition has an Izod notched impact of greater than 0.5 ft·lb/in at −40° C. as determined by ASTM D256 10, Method A, and an elastic modulus of greater than 700 psi at 130° C. as determined by ASTM D412.

2. A thermoplastic polyurethane composition as set forth in claim 1 wherein said thermoplastic polyurethane is selected from the group of polyether-based thermoplastic polyurethanes, polyester-based thermoplastic polyurethanes, and combinations thereof.

3. A thermoplastic polyurethane composition as set forth in claim 1 wherein said thermoplastic polyurethane is a polyether-based thermoplastic polyurethane.

4. A thermoplastic polyurethane composition as set forth in claim 1 wherein said thermoplastic polyurethane has a weight average molecular weight of greater than 50,000 g/mol.

5. A thermoplastic polyurethane composition as set forth in claim 1 wherein said thermoplastic polyurethane has a softening point of greater than 150° C. as determined by ASTM D1525-09.

6. A thermoplastic polyurethane composition as set forth in claim 1 wherein said thermoplastic polyurethane has a tensile strength of from 2,000 to 10,000 psi at 23° C. as determined by ASTM D412.

7. A thermoplastic polyurethane composition as set forth in claim 1 wherein said polyoxymethylene has a weight average molecular weight of greater than 50,000 g/mol.

8. A thermoplastic polyurethane composition as set forth in claim 1 wherein said polyoxymethylene has a melting point of greater than 160° C.

9. A thermoplastic polyurethane composition as set forth in claim 1 wherein said polyoxymethylene has a tensile strength of from 8,000 to 11,000 psi at 23° C. as determined by ASTM D638.

10. A thermoplastic polyurethane composition as set forth in claim 1 further comprising a cross-linking agent comprising a thermoplastic polyurethane carrier and an isocyanate component.

11. A thermoplastic polyurethane composition as set forth in claim 10 further comprising 1 to 15 parts by weight of said cross-linking agent per 100 parts by weight of said thermoplastic polyurethane composition.

12. A thermoplastic polyurethane composition as set forth in claim 1 having an Izod notched impact of greater than 0.9 ft·lb/in at −40° C. as determined by ASTM D256 10 (Method A).

13. A thermoplastic polyurethane composition as set forth in claim 1 having a tear strength of greater than 1,200 pli at 23° C. as determined by ASTM D624, Die C.

14. A thermoplastic polyurethane composition as set forth in claim 1 having a tensile strength of greater than 5000 psi at 23° C. as determined by ASTM D412.

15. A thermoplastic polyurethane composition as set forth in claim 1 having a tensile strength of greater than 750 psi at 130° C. as determined by ASTM D412.

16. A thermoplastic polyurethane composition as set forth in claim 1 having a flexural modulus of greater than 40,000 psi at 23° C. and greater than 2,000 psi at 130° C. as determined by ASTM D790.

17. A thermoplastic polyurethane composition as set forth in claim 1 having a Shore D Hardness of from 50 to 100 pts as determined by ASTM D2240.

18. A thermoplastic polyurethane composition as set forth in claim 1 having a specific gravity of from 1.11 to 1.25 g/cm$^3$.

19. A fluid transfer tube formed from the thermoplastic polyurethane composition of claim 1.

20. A method of forming the fluid transfer tube set forth in claim 19, said method comprising the steps of:
   combining the thermoplastic polyurethane and the polyoxymethylene to form the thermoplastic polyurethane composition; and
   extruding the thermoplastic polyurethane composition to form the fluid transfer tube.

* * * * *